Patented Nov. 13, 1934

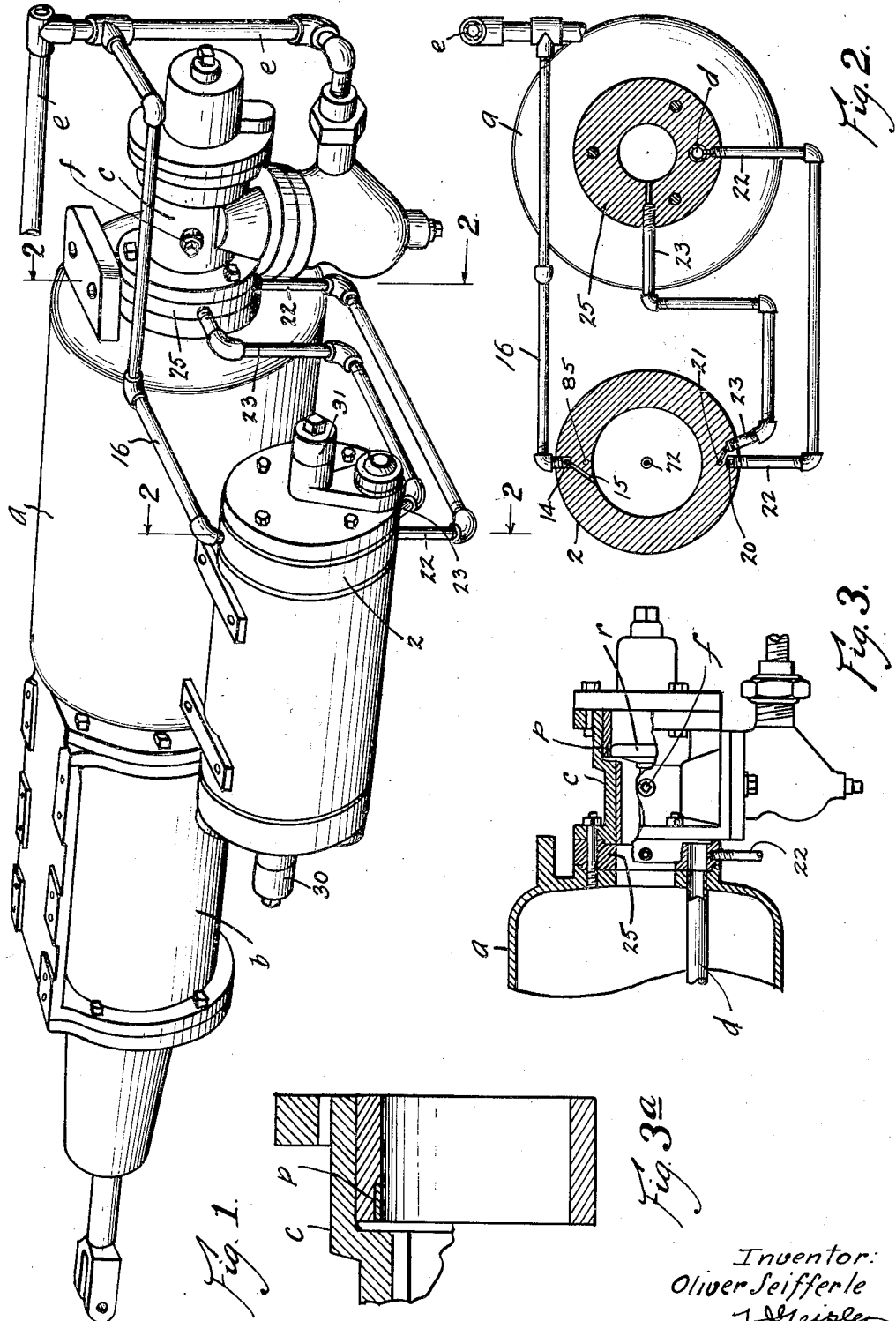

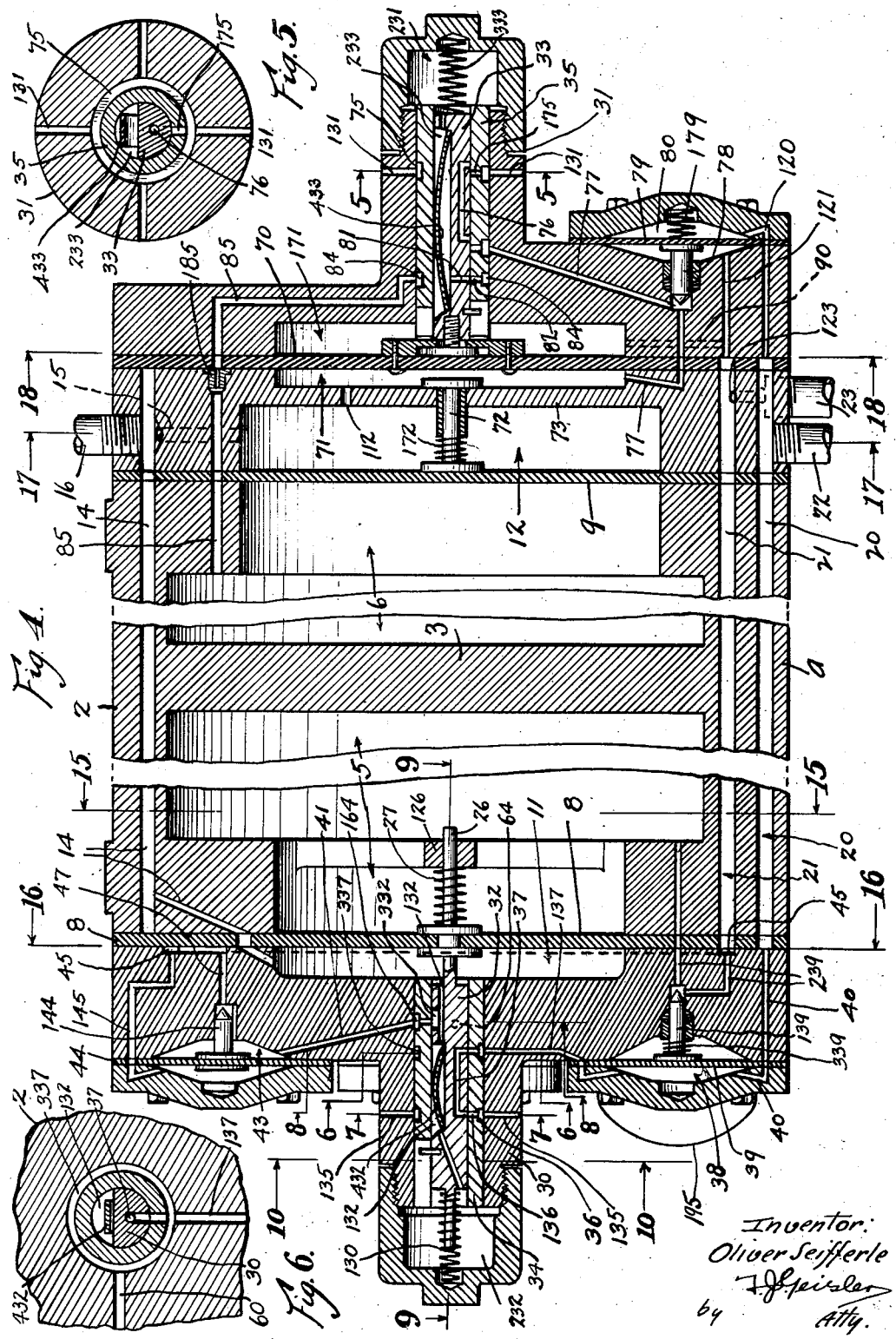

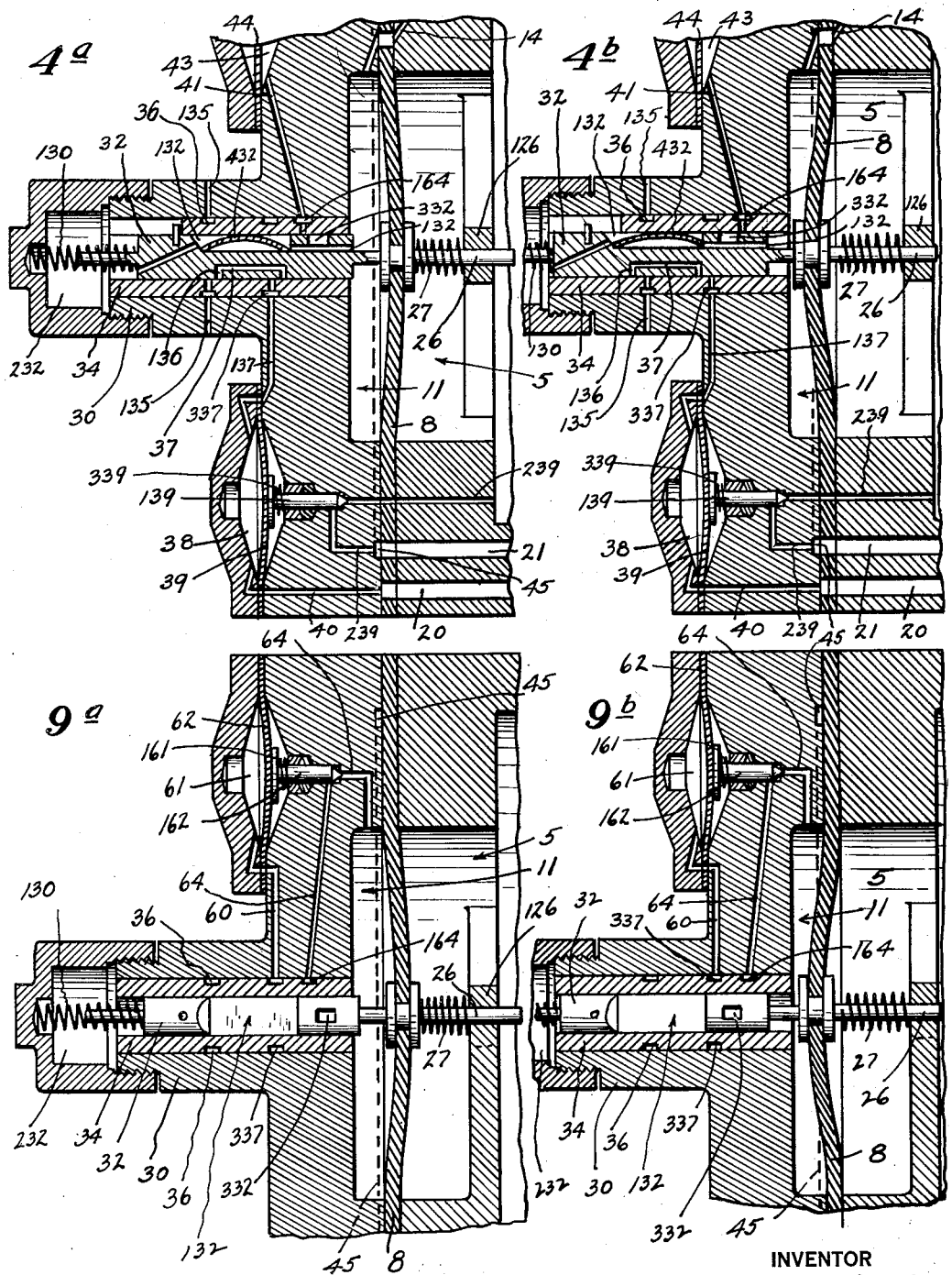

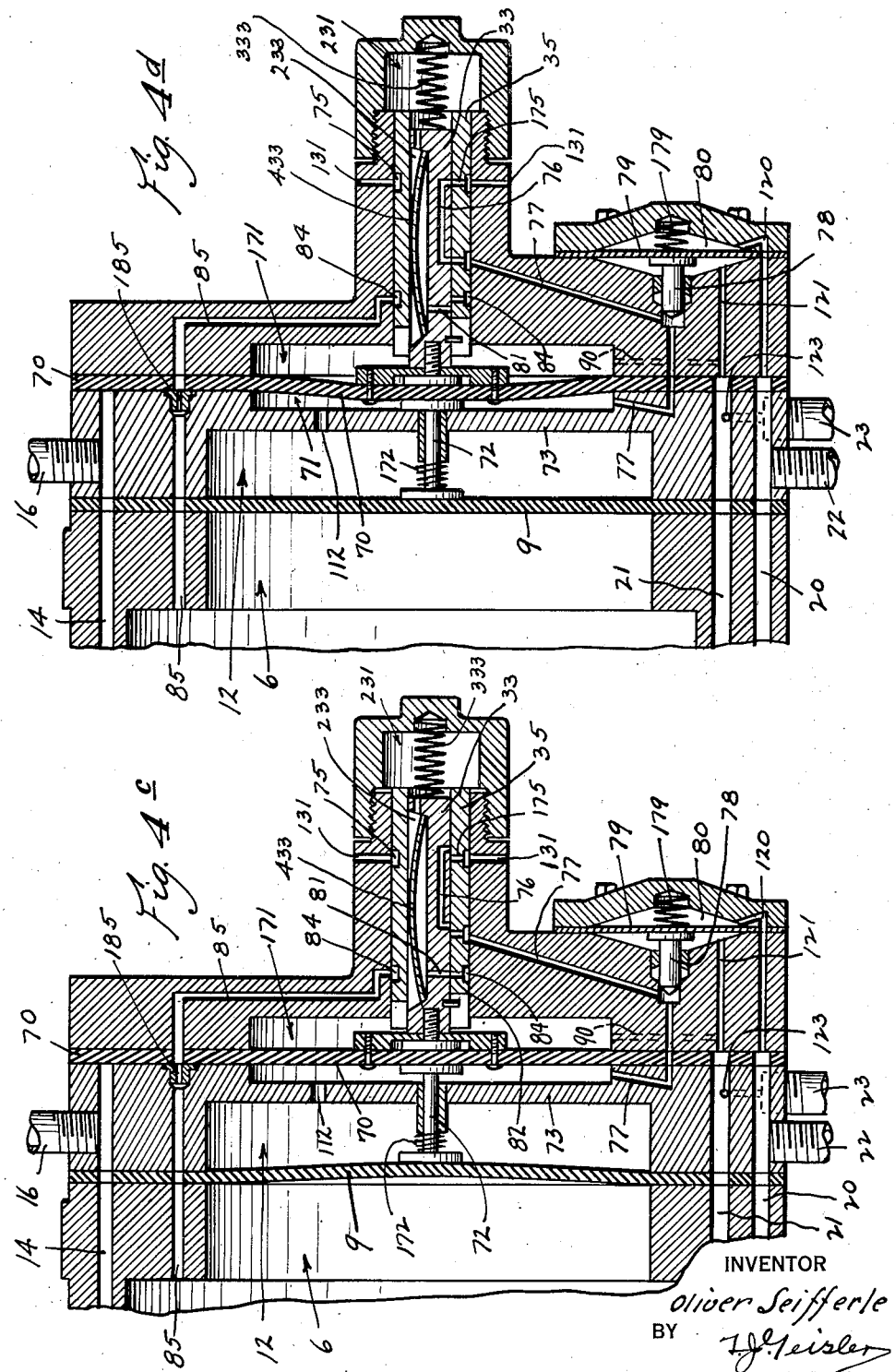

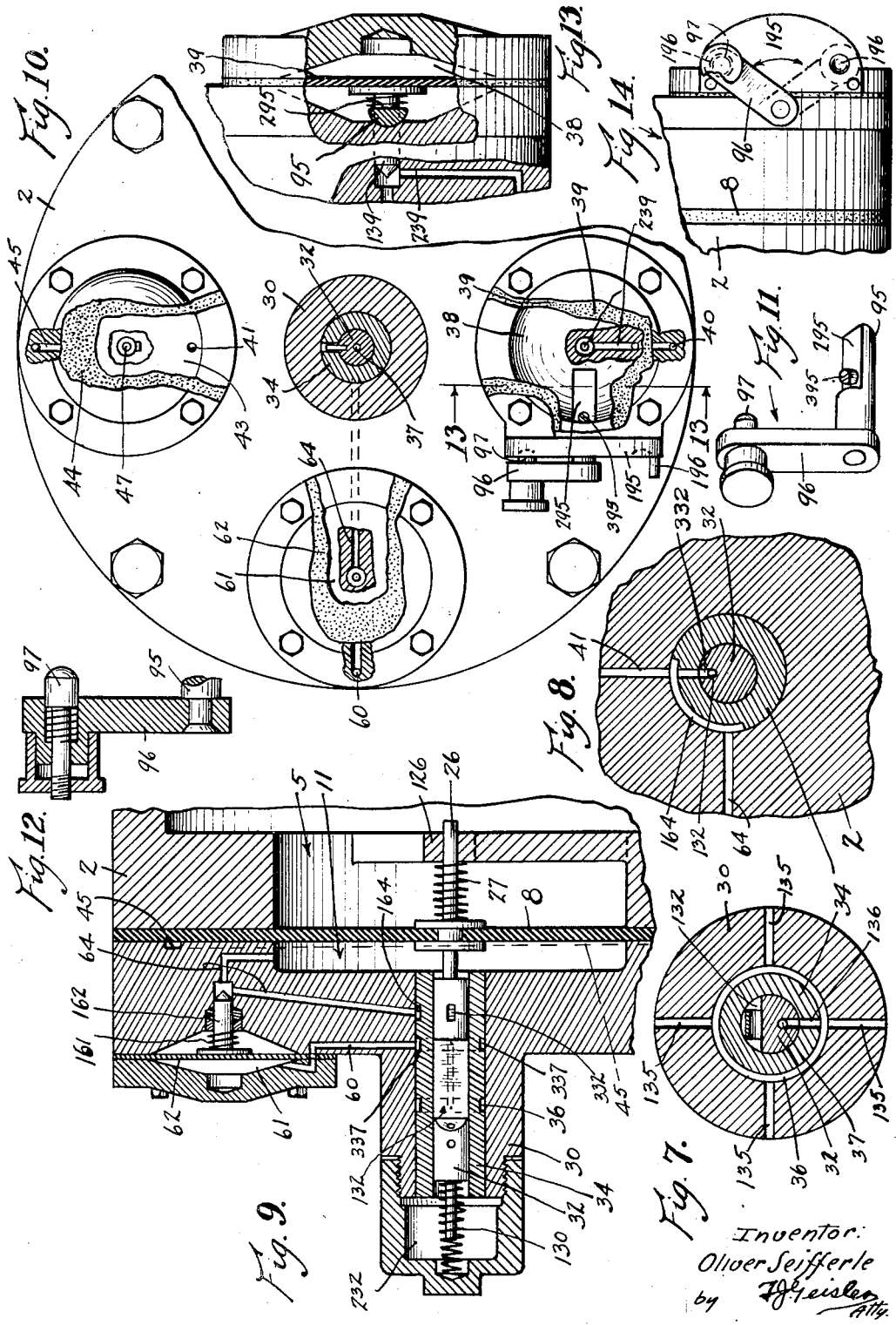

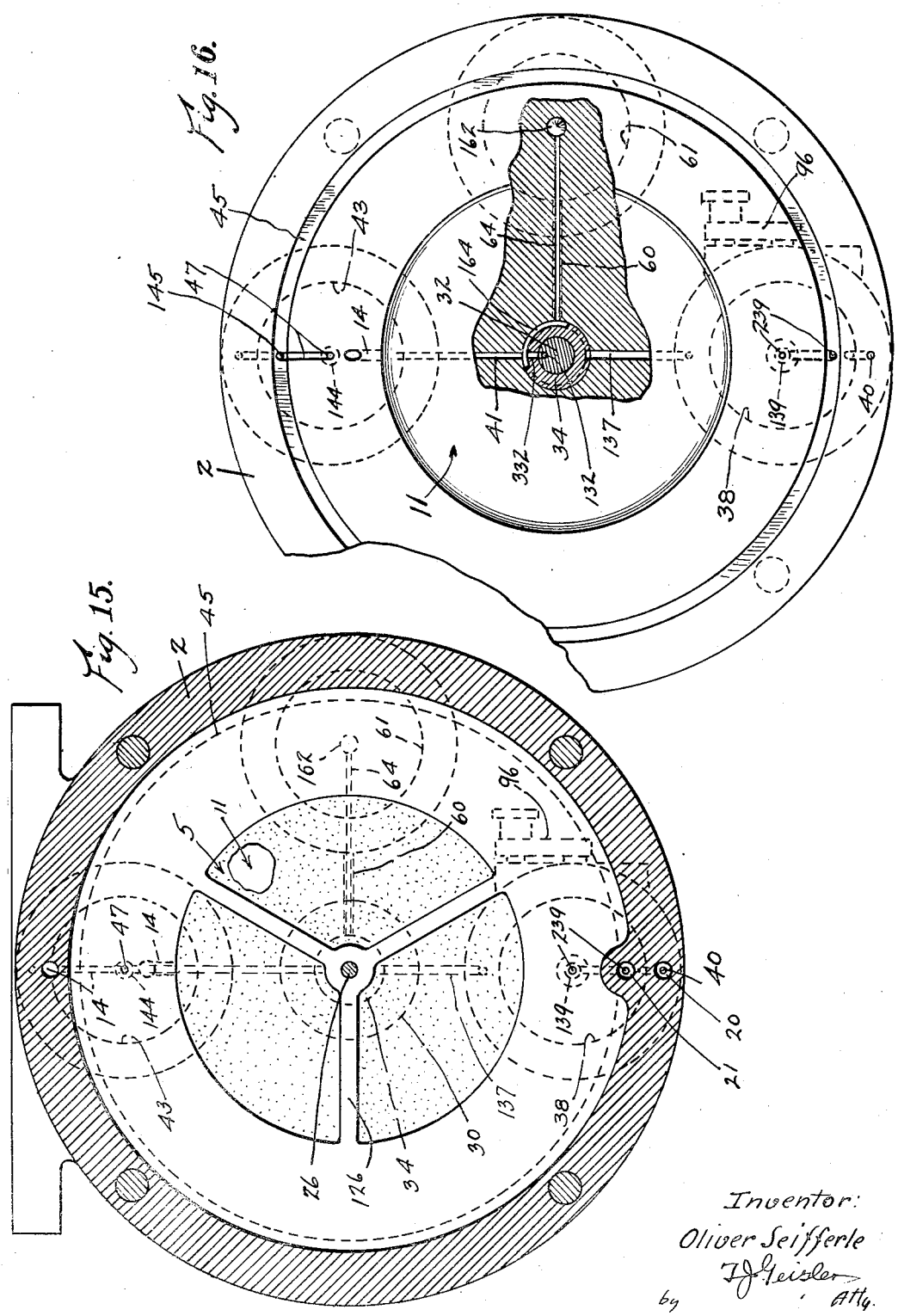

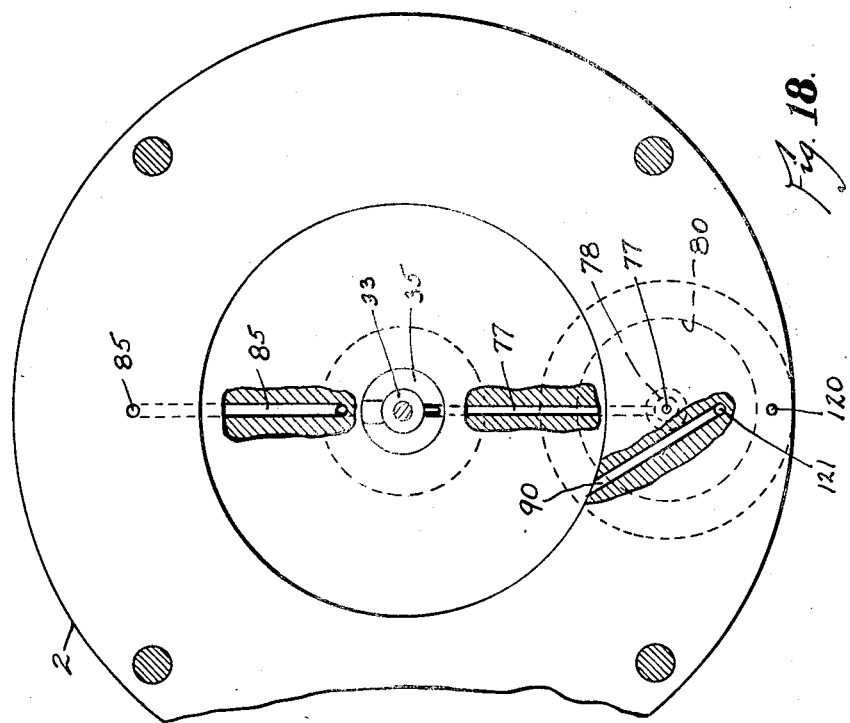
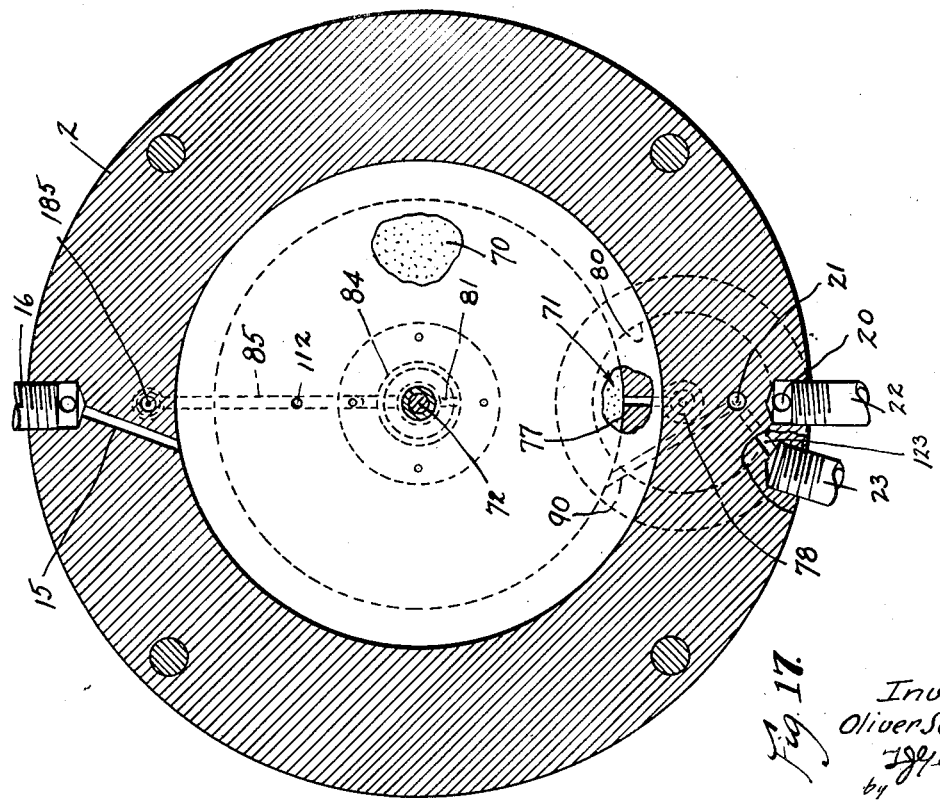

1,980,504

UNITED STATES PATENT OFFICE 1,980,504

PRESSURE CONTROL DEVICE FOR AIR BRAKE MECHANISM

Oliver Seifferle, Portland, Oreg., assignor to International Air Brake Control Company, Portland, Oreg., a corporation of Oregon Application May 9, 1932, Serial No. 610,135

29 Claims. (Cl. 303—35)

My invention relates to automatic air brakes.

The object of my invention is to provide a control device, in combination with the present air brake mechanism, adapted to remedy certain deficiencies in the operation of the triple-valve; in other words, to provide an air-pressure control device, whereby to assure the efficient operation of the air-brake mechanism throughout the length of the train, notwithstanding variations of pressure in the brake-pipe with relation to a car located some distance from the locomotive.

In the first place, with the present automatic air-brake mechanisms, it is not possible to apply the brakes of all the cars, in a train of any length, simultaneously and with equal force, for the reason that a reduction of pressure in the brake-pipe, at the locomotive for the purpose of applying the brakes, does not take effect immediately throughout the length of the train, but to the contrary takes some time to reach the end of the train, due partly to frictional resistance to the flow of air through the brake-pipe.

In consequence, the fall of pressure in the brake-pipe at cars remote from the locomotive is not sufficient, or is too slow, to actuate the triple-valves and apply the brakes simultaneously with those on the cars near the locomotive. Further, a fall of pressure too slow to actuate the triple-valves for applying the brakes may be insufficient to open the triple-valves and thus permit pressure to "bleed" through the same from the auxiliary reservoir to the brake pipe, thus tending to further retard the said reduction of pressure.

Further, the fall in brake-pipe pressure may be only sufficient to partly move the triple-valves, in which position they have a tendency to stick until the brake pipe pressure has fallen sufficiently to overcome such resistance. But then the triple valve is moved suddenly and goes to emergency application position. This causes large volumes of air to be admitted from the brake-pipe directly into the brake cylinder through the emergency valve included in the triple valve, and a substantial further reduction of pressure in the brake-pipe is thus effected. This actuates the triple valves on the adjacent cars to emergency application position and sets up reflex pressure waves in the brake pipe which create local rises of pressure causing the triple valves in the path of such wave to release the brakes.

In the second place, the brakes cannot be released simultaneously on all the cars, for the reason that the increase of pressure in the brake pipe necessary to cause their release takes effect first at the cars nearest the locomotive, but due to frictional resistance to the flow of pressure through the brake pipe is delayed in reaching the cars at the rear of the train.

Further, the flow of such increase of pressure towards the rear of the train is reduced, by the pressure taken from the brake pipe to recharge the auxiliary reservoirs, and since the auxiliary reservoirs charge at the rate of approximately one pound a second, the increase of pressure in a long train will be completely reduced before it can reach the end of the brake pipe.

As a result of the above described deficiencies in the present air brake mechanism, the cars of the train are caused to overtake and strike one against the other or to hold back and jerk the train, which is hard on the equipment, disagreeable for the passengers and bad for freight.

Furthermore, when the brakes have been applied, the auxiliary reservoir cannot be recharged without releasing the brakes, for in order to recharge the auxiliary reservoir, the pressure in the brake-pipe must necessarily be made greater than in the auxiliary reservoir, which, as mentioned, will effect the release of the brakes.

Thus, when frequent applications of the brakes have been made, the pressure in the auxiliary reservoir falls to such a point that the brakes are incapable of further application.

In order to prevent the occurring of the last mentioned condition, so-called "retaining" valves have been provided which are connected to the exhaust ports of the triple valves, and are adapted to prevent the release of pressure from the brake-cylinder below a predetermined setting; but such retaining valves must be operated manually.

Further, with the present air brake mechanism, if the engineer permits the auxiliary reservoirs to become overcharged, that is, to be charged above seventy pounds gauge pressure—or the normal operating pressure—while he is releasing the brakes, then, when the engineer has completed the release of the brakes, and again reduced the brake pipe pressure back to normal, the pressure built up in the auxiliary reservoirs by said overcharging will tend to produce an unintended application of the brakes.

Therefore, the particular purpose of my invention is to provide a pressure-control device for automatic air brake mechanisms adapted to effect a uniform and substantially simultaneous application, or release, of the brakes of all the cars in a train; such pressure control being adapted so to control the relative pressures in the brake pipe, in the auxiliary reservoir, and in the brake cylinder as to provide a complete and effective control of the air brakes.

A further object of my invention is to provide a control device adapted to permit the recharging of the auxiliary reservoir when the brakes are applied, without causing the brakes to be released.

My invention further has for its object the providing of a pressure control device adapted for effecting a uniform recharging of the auxiliary reservoirs when the brakes have been applied, and to prevent overcharging of the same.

A further object of my invention is to provide a pressure control device adapted to be used in trains in which only part of the cars are equipped with my pressure control, in order that my pressure control will not conflict with the normal operation of the triple valve on those cars provided only with standard brake mechanisms.

Further, in the present air brake mechanisms, in order for the engineer to make an emergency application of the brakes, all the pressure is exhausted from the brake pipe, to insure that all the triple valves will be opened as soon as possible and will stay open from the auxiliary reservoirs to the brake cylinders and thus apply the brakes as nearly simultaneously and with as full force as possible.

In consequence, after an emergency application of the brakes, they are inoperative and the train must be stopped to permit the brake pipe and auxiliary reservoirs to be recharged.

Therefore a further object of my invention is to provide a control device adapted to provide for an emergency application of the brakes without releasing all the pressure from the brake pipe.

I attain the above and other incidental objects of my invention in a pressure control device, the construction and mode of operation of which are hereinafter described with reference to the accompanying drawings.

In the drawings:

Fig. 1 shows a perspective view of one unit of an automatic air brake mechanism and illustrates my pressure control device connected between the brake pipe and the auxiliary reservoir and with the brake cylinder exhaust port;

Fig. 2 shows a section taken on the line 2—2 of Fig. 1 and further illustrates how my pressure control device is connected between the brake pipe and the auxiliary reservoir and with the brake cylinder exhaust port;

Fig. 3 shows a fragmentary side elevation of a portion of the auxiliary reservoir and the triple valve, partly in section to disclose the details of the latter;

Fig. 3a shows a fragmentary detached view of the triple valve housing and illustrates how the feed grooves are closed;

Fig. 4 shows an enlarged central longitudinal section of my pressure control device and illustrates in detail the construction thereof;

Fig. 4a shows an enlarged fragmentary section of the left hand end of my pressure control device controlling the auxiliary reservoir recharging and the release of the brakes, with its main diaphragm operated slide valve in right hand position;

Fig. 4b shows the same with the main diaphragm operated slide valve in the left hand position;

Fig. 4c shows a fragmentary section taken similarly to Fig. 4 of the right hand end of my pressure control device which controls the application of the brakes, and illustrates the diaphragm operated piston holding the main diaphragm operated slide valve in closed position;

Fig. 4d shows the same with the diaphragm operated piston in normal position and the said main diaphragm operated slide valve in the left hand position;

Fig. 5 shows a section taken on the line 5—5 of Fig. 4 and illustrates the arrangement of the supplementary exhaust ports from the brake pipe controlled by the diaphragm operated slide valve in the right hand end of my pressure control device;

Fig. 6 shows a section taken on the line 6—6 of Fig. 4 and illustrates the arrangement of certain ducts controlled by the diaphragm operated slide valve at the left hand end of my pressure control device;

Fig. 7 shows an enlarged section taken on the line 7—7 of Fig. 4 and illustrates the arrangement of the exhaust ports from the brake cylinder controlled by the main diaphragm operated valve in the left hand end of my device;

Fig. 8 shows a section taken on the line 8—8 of Fig. 4 at the left hand end of my pressure control device and illustrates the arrangement of the duct leading to the auxiliary reservoir from the compression chamber connected with the brake pipe and its connection with the by-pass duct also leading to the auxiliary reservoir;

Fig. 9 shows a fragmentary section taken on the line 9—9 of Fig. 4 and on a plane normal with the plane of Fig. 4 and further illustrates the arrangement of the said by-pass ducts and the valve controlling the same;

Fig. 9a shows an enlarged fragmentary section similar to Fig. 9 and illustrates the main diaphragm operated slide valve in the right hand position, and the valve controlling the by-pass duct in closed position;

Fig. 9b shows the same with the diaphragm operated slide valve in its left hand position;

Fig. 10 shows a fragmentary view of the left hand end of my pressure control device taken on the line 10—10 of Fig. 4 with portions broken away to disclose the construction of the secondary diaphragm chambers and the valves controlled by them;

Figs. 11 and 12 show detached views of the cut out lever for rendering the valve inoperative controlling the duct from the auxiliary reservoir to one of the pressure chambers;

Figs. 13 and 14 show side elevations of the said cut out lever mounted upon my pressure control device;

Fig. 15 shows a section taken on the line 15—15 of Fig. 4 and illustrates the arrangement of the annular duct leading to the auxiliary reservoir;

Fig. 16 shows a section taken on the line 16—16 of Fig. 4 and further illustrates the arrangement of the said annular duct and the ducts connected therewith which are controlled by the main diaphragm operated slide valve;

Fig. 17 shows a section taken on the line 17—17 of Fig. 4 and illustrates the ducts at the right hand end connecting the brake pipe, the auxiliary reservoir and the brake cylinder, with my pressure control device; and Fig. 18 shows a section taken on the line 18—18 of Fig. 4 and illustrates the arrangement of the ducts connecting the pressure chambers in the right hand end of my pressure control device with each other and the atmosphere.

Referring now to Figs. 1, 2 and 3, I will briefly describe the present air brake unit, which, as well known, comprises an auxiliary reservoir $a$, a brake cylinder $b$ and a triple valve $c$. The triple valve is connected to the brake pipe $e$ leading from the main reservoir in the locomotive and is connected with and controls the charging and discharging of the auxiliary reservoir and the brake cylinder, the latter through a conduit $d$ and exhaust port $f$. A piston, not shown, is provided within the brake cylinder adapted to be operated by pressure admitted into the brake cylinders by the triple valve from the auxiliary reservoir. The said piston is operatively connected to the brake mechanism proper, not shown.

The brakes are applied by exhausting air from the brake pipe $e$ to below the pressure in the auxiliary reservoir through a brake valve, located in the locomotive and operated by the engineer. This causes the piston $r$ of the triple valve $c$ to be moved to the right by the pressure in the auxiliary reservoir, which closes the feed grooves $p$ shutting off the auxiliary reservoir from the brake pipe $e$ and closing the exhaust port $f$, and opening the conduit $d$ from the auxiliary reservoir to the brake cylinder $b$ and allowing pressure to flow into the brake cylinder and actuate the brake mechanism.

The brakes are released and the auxiliary reservoirs are recharged by the engineer raising the pressure in the brake pipe $e$ above that in the auxiliary reservoir which moves the piston $r$ to the left opening the brake pipe $e$ to the auxiliary reservoir through the feed grooves $p$, and the exhaust port $f$ of the brake cylinder, to the atmosphere, at the same time shutting off the brake cylinder from the auxiliary reservoir.

Referring now particularly to Fig. 4, my pressure control device comprises a housing 2 connected to the brake pipe $e$ by a pipe 16 and with the auxiliary reservoir and brake cylinder by pipes 22 and 23, respectively, through a manifold 25 provided between the auxiliary reservoir $a$ and the triple valve $c$, see Figs. 1, 2 and 3.

The exhaust port $f$ of the triple valve, when the latter is connected with my pressure control, is closed, see Fig. 1, and all exhaust from the brake cylinder is carried on through the pipe 22, as hereinafter further described. The feed grooves of the triple valves are also closed, as at $p$, see Fig. 3a, and all pressure enters the auxiliary reservoir through my pressure control device.

The housing 2 is divided by a central partition 3 into retaining compression chamber 5 and supplementary compression chamber 6. The chamber 5 is divided by a diaphragm 8 into a second smaller compression chamber 11 connected with the pipe 16 and brake pipe $e$ through a passageway 14. The supplementary compression chamber 6 is also divided by a diaphragm 9 into intermediate compression chambers 12 and 71, the chamber 12 being connected by a duct 15 with the passageway 14 and the brake pipe $e$, and the chambers 12 and 71 being connected by a port 112 as later fully explained.

The ends of the housing 2 are provided with centrally arranged bosses 30, 31 in which are mounted slide valves 32, 33, respectively, slidable within stationary sleeves 34, 35.

The stem 26 of the slide valve 32 is connected with and operable by the diaphragm 8 and is extended through the latter. The end of the stem 26 is slidably mounted in a spider-like guide 126 in the chamber 5, see Fig. 17, and a spring 27 is mounted thereon bearing against the latter and the diaphragm 8, and adapted to resist flexing of the diaphragm 8 to the right with a force of approximately three pounds.

The boss 30 is provided with radial exhaust ports 135, see Fig. 7, leading from an annular duct 36 in the sleeve 34. A port 136 is provided in the duct 36 of the slide valve 32 adapted to register in the neutral position of said slide valve with one end of a longitudinally extended duct 37 in the slide valve 32. The other end of the duct 37 is adapted to register at the same time with a duct 137 extending through the sleeve 34 to the right hand side of a secondary chamber 38 provided with a diaphragm 39.

A duct 40 connects the same side of the chamber 38 with a passageway 20 leading to the pipe 22 and the brake cylinder. The diaphragm 39 carries a valve member 139 normally held open by a spring 339 and controls a duct 239 leading from the chamber 5 to the passageway 21 connected by a duct 123 with the pipe 23 and the auxiliary reservoir.

The slide valve 32 is provided with a longitudinal space 132 connecting a chamber 232 in the end of the boss with the chamber 11 and permits the pressure in them to equalize. A spring 130 is provided in said chamber 232 bearing against the end of the boss and the said valve 32 and a flat spring 432 is provided in a recess in the duct 132 bearing against the sleeve 34, both being adapted to prevent free movement of the said slide valve 32. The duct 132 is provided with an elongate port 332 so proportioned as to be closed by the movement of the slide valve 32 to the left after the latter closes the said duct 136, of the sleeve 34, see Figs. 4 and 8. The port 332 leads to a duct 41 extending through the sleeve 34 to the right hand side of a secondary chamber 43 provided with a diaphragm 44.

The other side of the secondary chamber 43 is connected by a duct 145 and an annular duct 45, see Figs. 4 and 16, with the said passageway 21 connected to the auxiliary reservoir. The diaphragm 44 carries a normally open valve member 144 controlling a duct 47 leading from the same side of the chamber 43 in which the duct 41 enters, and to the said duct 45 leading to the passageway 21 and the auxiliary reservoirs.

An annular duct 337, see Figs. 4 and 6, is provided in the sleeve 34 connecting the duct 137 and a duct 60, see Figs. 6 and 9, leading to the right hand side of a secondary chamber 61, shown in Fig. 9, provided with a diaphragm 62. The diaphragm 62 carries a valve member 162 which controls a duct 64 connecting the chamber 11 to an annular duct 164, see Fig. 8, in the sleeve 34, connected with the said duct 41. A spring 161 is provided on the valve member 162 normally holding the same open.

The slide valve member 33 carried by the boss 31 on the opposite end of the housing 2 is connected to a diaphragm 70 located within the second intermediate compression chamber 71 and separating the latter from auxiliary compression chamber 171 of greater volume. The second intermediate compression chamber 71 is connected by a port 112 with the chamber 12 as mentioned and the auxiliary compression chamber 171 is connected by a duct 90 with the passageway 21 and the auxiliary reservoir. A double ended piston 72 is slidably mounted in the wall 73 separating the chambers 12 and 71, and is normally held against the diaphragm 9 by a spring 172 having a predetermined force of seven pounds, approximately.

The boss 31 is provided with radial exhaust ports 131, see Fig. 5, leading from an annular duct 75 in the sleeve 35. The duct 75 is provided with a port 175 adapted to register in the left hand position of the slide valve with one end of a longitudinally extended duct 76 in the latter. The other end of the duct 76 is adapted to register in such position with a duct 77 extending through the sleeve 35 and leading to the second intermediate compression chamber 71. The duct 77 is controlled by a valve member 78 carried by a diaphragm 79 provided within a secondary chamber 80. The valve member 78 is held normally closed by a spring 179.

The secondary chamber 80 is connected on the side of the valve member 78, by a duct 121 with the passageway 21 and the auxiliary reservoir and on the other side of the diaphragm 79 by a duct 120 with the passageway 20 and the brake cylinder.

The valve member 33 is provided with a longitudinal passageway 233 connecting the auxiliary compression chamber 171 and a chamber 231 in the end of the boss 31 to permit the pressure in them to equalize. A spring 333 is provided in the chamber 231 and a flat spring 433 is provided in the passageway 233 which bears against the sleeve 35 both being adapted to hold the slide valve 33 against free movement. A port 81 is provided in the passageway 233 in the slide valve 33 arranged to register with the port 82 of an annular duct 84 in the sleeve 35 in the right hand position of the slide valve, see Fig. 4d. The duct 84 is connected to a duct 85 provided with a restriction 185 leading to the supplementary compression chamber 6.

It is to be noted that the retaining compression chamber 5 is connected with the auxiliary reservoir through the duct 239 and passageway 21 and the chamber 11 is connected with the brake pipe e through the passageway 14 and with the auxiliary reservoir through the ducts 132, 41 and 45 and passageway 21. The exhaust ports 135 for the brake cylinder are connected with the latter through the ducts 137 and 40 and passageway 20, and are controlled by the slide valve 32, which also controls the ducts 41 and 45 from chamber 11 to the auxiliary reservoir. The duct 64 from the chamber 11, which is connected to the ducts 41 and 45 leading to the auxiliary reservoir serves as a by-pass around the valve 32 when the latter closes the port 332.

Chamber 12 is connected with the brake pipe through duct 15, chamber 71 with the auxiliary reservoir through duct 90, and passageway 21. Chambers 171 and 6 are connected by the duct 85 and chamber 12 is also connected by duct 77 with the atmosphere, the latter being controlled by slide valve 33 and valve 78.

Operation

The auxiliary reservoir of the air brake device is not charged through the triple valve c, referring to Fig. 1, as usual, but the so-called feed grooves in the latter are closed in some suitable manner, designated by p in Figs. 3 and 3a, and the air for charging the auxiliary reservoir is thus compelled to flow through my pressure control device. Likewise, the exhaust port f of the triple valve is closed and all exhaust from the brake cylinder takes place through the pipe 22 which is connected to the conduit d of the brake cylinder, and my pressure control device.

Assuming that the brake system has not yet been charged, and that the air brake system of the train is to be initially charged, the brake valve in the locomotive is set at running position, by which the pressure in the brake pipe is at a maintained gauge-pressure of seventy pounds.

The operating parts of my pressure control will be positioned as shown in Fig. 4, and it is to be noted that:

The pressure from the brake pipe then enters the chamber 11 of my pressure control through the passageway 14 and thence passes through the duct 132 and port 332 in the slide valve to duct 41 leading through duct 47 to the annular duct 45, then through duct 239 to retaining compression chamber 5, and through ducts 21 and pipe 23 to the auxiliary reservoir. The pressure in the chamber 11 moves the diaphragm 8 and therewith slide valve 32 to the right, as shown in Fig. 4a, compressing spring 27, thus closing the port 332. But in order to prevent the closing of the port 332 cutting off further pressure from the auxiliary reservoir, I have provided the duct 64, see Figs. 8 and 9, leading from chamber 11, through the annular duct 164 in the sleeve 34, and thence to the duct 41, the chamber 43, duct 47 and passageway 21 to the auxiliary reservoir.

Pressure further is transmitted through duct 239 and annular duct 45 to retaining compression chamber 5, rendering the pressure in the latter equal to that in chamber 11, and in so doing operating the diaphragm 8 and therewith the valve 32 to normal position, as shown in Fig. 4. In such position the ducts 40 and 137, and the passageway 20 from the brake cylinder are open to the atmosphere through the annular duct 36, and exhaust ports 135.

During the charging of the auxiliary reservoir, pressure is also transmitted from the brake pipe through the duct 15 to the chamber 12 and from the latter through port 112 to the second intermediate compression chamber 71 and also through annular duct 45, the passageway 21 and duct 90 to the auxiliary compression chamber 171, so that the pressures on each side the diaphragm 70 are equal, and the slide valve 33 is held in its normal position, as shown in Fig. 4. In such position of the valve 33 the auxiliary compression chamber 171 is connected with the supplementary compression chamber 6 by port 81, in the sleeve 35, and the ducts 84 and 85 so that the pressures are now also equal in the chambers 6 and 171.

My pressure control is now charged and ready for service. Let us now assume that the brakes are to be applied. This is accomplished by reducing the pressure in the brake pipe. Such reduction will be felt nearest the locomotive, with greatest effect and of course will actuate the triple valves and the brakes.

In the cars nearest the locomotive, pressures in chambers 12 and 71 fall rapidly, for at least 7 pounds, below that in chamber 6, which moves the diaphragm 9 and therewith piston 72 to the right against diaphragm 70 as shown in Fig. 4c, compressing spring 172, the strength of which is approximately 7 pounds. The piston 72 thus holds the diaphragm 70 and slide valve 35 from being moved inward by the pressure in chamber 171 which is the same as that in the auxiliary reservoir, and does not fall as rapidly as the brake pipe pressure.

This prevents the exhaust ports 131 from being opened by the movement of the slide valve 33, and exhausting pressure from chamber 71, through duct 77 to the atmosphere in addition to the exhaustion effected through the brake pipe, which would cause the application of the brakes with greater force than intended by the engineer.

But, assuming my pressure control device is one located toward the rear of the train where the reduction of pressure in the brake pipe may be insufficient or too slow to actuate the triple valves to apply the brakes (i. e. less than 7 pounds), the resistance imposed by the spring 172). The fall of pressure in chambers 12 and 71 is then less than the strength of spring 172, so that the pressure in chamber 6 cannot move diaphragm 9 and piston 72 against the diaphragm 70.

In such case, the auxiliary reservoir pressure in chamber 171, which is greater than in chamber 71, moves the diaphragm 70 and therewith slide valve 33 to the left as shown in Fig. 4d and into contact with piston 72. The slide valve 33 now closes the duct 85 connecting chamber 171 with chamber 6, and opens duct 77 from chamber 71 to the exhaust ports 131, thus releasing the brake pipe pressure from chamber 71, and causing the immediate application of the brakes by a further reduction of pressure in the brake pipe sufficient to actuate the triple valve. As a result all the brakes throughout the train are applied substantially in unison.

Of course, as soon as the ports 131 are opened, the pressure in chambers 71 and 12 fall rapidly and as soon as they become 7 pounds less than the pressure in chamber 6, the pressure in the latter chamber will move diaphragm 9 and therewith piston 72 back to the position shown in Fig. 4c against diaphragm 70 and close slide valve 33 and prevent further release of pressure from the brake pipe.

The pressures in supplementary compression chamber 6 and auxiliary compression chamber 171 now slowly equalize through the duct 85 and its restriction 185; but if the brake pipe pressure in the chambers 12 and 71 falls more slowly than the pressure in chamber 171 or stops falling, due to reflex pressure waves in the brake pipe, effecting therein rises in pressure and thus preventing the full application of the brakes, the resulting greater pressure in chamber 12, in addition to the strength of spring 172 which is still compressed, will move diaphragm 9 back to its normal position in Fig. 4 and piston 72 to the left that is away from diaphragm 70 and release slide valve 33.

This permits the auxiliary reservoir pressure in chamber 171, which of course falls more slowly than the brake pipe pressure in chamber 12, and hence is greater, to move diaphragm 70 inward and therewith slide valve 33 to the position in Fig. 4d, again opening exhaust ports 131 and assures that the triple valves will stay open to the brake cylinder.

Of course, as soon as the brake pipe pressure in chambers 12 and 71 again falls below that in chamber 6, the diaphragm 9 and piston 72 will again be moved against slide valve 33 and close the exhaust ports 131.

In this connection, it is to be noted that chambers 12 and 71 are only connected by a relatively small port 112, and that the area of the diaphragm 70 is less than that of diaphragm 9, so that variations of pressure in chamber 12 act with greater force on diaphragm 9 than a corresponding variation of the pressure in chamber 71 acts on diaphragm 70.

By such arrangement, a relatively slight rise in pressure in chamber 12 supplemented by the spring 172, which is still compressed in the position shown in Fig. 4c, would be sufficient to move diaphragm 9 back into its normal position, and therewith the piston 72; thus freeing the diaphragm 70; and by reason of the relatively small area of the ports 112, the pressure in chamber 12 will flow rather slowly into chamber 71 and thus permit the auxiliary reservoir pressure in chamber 171 to move diaphragm 70 inward, and therewith the valve 33, to open the ports 131; which immediately causes a rapid fall in brake pipe pressure in chamber 71 and assures that the triple valves will stay open to the brake cylinder.

The duct 77 from chamber 71 is controlled by valve 78 and should the auxiliary reservoir pressure have fallen until nearly equal the brake cylinder pressure, for example from repeated applications of the brakes, the brakes could no longer be applied, even though further reductions of pressure were made in the brake pipe and in chamber 71. Then the brake cylinder pressure acting through conduit 20 against diaphragm 79, plus the force of spring 179 will close said valve 78 and prevent release of brake pipe pressure from chamber 71 through duct 77 until the auxiliary reservoir can be recharged, as before described.

In exhausting pressure in the brake pipe to apply the brakes, the pressure in chamber 11 falls so that the pressure in chamber 5 being greater moves diaphragm 8 and slide valve 32 to the left to the position shown in Fig. 4b, and closes the duct 137 to exhaust ports 135, thus cutting off escape of air from the brake cylinder through the passageway 20. Such movement of slide valve 32 also closes elongate port 332 and prevents auxiliary reservoir pressure from flowing back into the brake pipe and building up the pressure therein which would tend to interfere with the reduction of pressure necessary to apply the brakes.

Simultaneously, the rise of pressure in the brake cylinder acts on the diaphragm 39, through the duct 40 and closes the valve 139 of the duct 239, and thus holds chamber 5 at its initial pressure, see Fig. 4b. However, the brake pipe pressure has fallen slightly in advance of the auxiliary reservoir pressure, approximately 2 pounds, so that the pressure in chamber 5 is now approximately 68 pounds.

After the brakes are applied, the brake valve is then returned to running position and the feed valve in the locomotive is reduced, say 3 pounds, or to 67 pounds, pressure, approximately 1 pound less than in chamber 5. The pressure in chamber 5, however, has fallen slightly due to the expansion of the air taking place when diaphragm 8 was moved to the left, so that the 67 pounds pressure in chamber 11 is sufficient to move diaphragm 8 and slide valve 32 slightly to the right, and open elongate port 332 to ducts 41, 47 and 45 to the auxiliary reservoir without opening exhaust ports 35 from the brake cylinder.

Thus the auxiliary reservoirs are now being recharged to replace the pressure lost during the application of the brakes, without causing the release of the brakes, as in the standard equipment.

It is to be noted that while the air pressures described in this specification are given specific normal gauge pressure values, that such values will vary proportionately throughout the length of a train, for example, running position brake pipe pressure is normally 70 pounds, and the normal working pressures in chambers 5 and 11 are given as 68 and 67 pounds, respectively, but they will vary proportionately throughout the length of the train, so that in fact if the brake pipe pressure was 60 pounds at a particular pressure control device, the pressure in chamber 5 would be 2 pounds less or 58 pounds and in chamber 11, 57 pounds or 3 pounds less than in chamber 11.

Further, the valve member 162 controlling the duct 64 is closed by pressure from the brake cylinder through ducts 40, 137 and 60 acting upon diaphragm 62, thus cutting off the recharge of the auxiliary reservoir through duct 64, and the only recharge now taking place is through ducts 41 and 47, which are controlled by the slide valve 32.

Thus the auxiliary reservoirs throughout the length of the train are recharged to a uniform pressure, since an increase of pressure in chamber 11 of more than 3 pounds (the strength of spring 27) over the pressure in chamber 5 will move slide valve 32 all the way to the right as shown in Fig. 4a, closing port 332 and duct 41 to the auxiliary reservoir, preventing charging of the latter, and each auxiliary reservoir is automatically shut off from the brake pipe when its pressure has been raised 3 pounds more than the pressure in chamber 5.

It is to be noted that the elongate port 332 is of such length as to be opened when the slide valve 32 is moved from its right or left position, shown in Figs. 4a and 4b, before the brake cylinder exhaust ports are opened. Thus recharging of the auxiliary reservoirs takes place only during the time the brake pipe pressure is between 67 and 70 pounds pressure, the force of spring 27, and the time during which the slide valve is at neutral or nearly neutral position.

Thus, increase of pressure in the brake pipe is not affected by brake pipe pressure flowing from the latter to the auxiliary reservoir while recharging the same.

To effect the release of the brakes, the engineer operates the brake valve to full release position, at which time the gauge pressure in the main reservoir is the usual one-hundred-thirty pounds of pressure, which without my pressure control would only effect the release of the brakes serially beginning at the head of the train, the pressure taken by the auxiliary reservoirs as they recharge preventing such increase of pressure reaching the cars at the end of the train and effecting the release of the brakes simultaneously with those near the locomotive.

No recharge of the auxiliary reservoirs is, however, now taking place, since elongate port 332 connected with ducts 41, 47 and 45 and the auxiliary reservoir are closed and by-pass duct 64 is closed by valve 162, which is still acted upon by brake cylinder pressure.

This prevents the increase of pressure in the brake pipe from being so reduced by the pressure being taken into the auxiliary reservoirs for recharging them as to be incapable of actuating the triple valves at the cars near the rear of the train. That is, if there are 100 cars in the train, each taking one pound of pressure a second into the auxiliary reservoirs, an increase effected by raising the brake pipe pressure to approximately one-hundred-thirty pounds to release the brakes, will be completely reduced before it reaches the end of the train. Thus, with the brake valve in full release position, the increase of pressure will not be reduced, except by leakage and frictional resistance and may be forced all the way to the end of a long train of cars to release the brakes.

With my pressure control, such increase of pressure at the head of the train and as far back in the train as the increase of pressure is sufficient to actuate the triple valves and release the brakes, the pressure in the chambers 11 is raised to at least three pounds greater than the pressure in chamber 5 (the force of spring 27) and the diaphragm 8 and slide valves 32 will be moved to the right, see Fig. 4a, compressing spring 27 and still holding the exhaust ports 135, from the brake cylinders closed and preventing the release of the brakes in this part of the train until the release of those at the rear end can be effected.

But, in the rear end of the train, where such increase of pressure in the brake pipe may be too slow to actuate the triple valves to release the brakes simultaneously with those on the cars near the locomotive, as soon as the pressures in chambers 11 become greater than in chambers 5, the diaphragms 8 and slide valve 32 will be moved to the right, as shown in Fig. 4a until the latter bears against spring 27, see Fig. 4, but without compressing it and thus opens the exhaust port 135 to the duct 137 and permits the escape of the pressure from the brake cylinder and releases the brakes in this part of the train.

However, the brakes at the forward end of the train have not yet been released, but the engineer immediately returns the brake valve to running position and the gauge pressure in the brake pipe falls to seventy pounds (the feed valve having been set at seventy pounds pressure) and the pressure in chamber 11 likewise falls to seventy pounds pressure, only two pounds above that in chamber 5 (which is sixty-eight pounds); therefore the spring 27, the strength of which is three pounds, then moves diaphragm 8 and slide valve 32 to the left to neutral position, as shown in Fig. 4; the slight rise of pressure in chamber 5, due to the compression caused by the inward movement of diaphragm 8 preventing further leftward movement and opens port 135 to the brake cylinder and releases these brakes.

The main reservoir located in the locomotive is charged to 130 pounds when an application of the train brakes is initiated by the engineer. It is this large volume of excess pressure that rapidly increases the brake pipe pressure when the engineer operates the brake valve to full release position. When brake cylinder pressure is present in duct 60, valve 162 is in closed position as shown in Fig. 9b; hence preventing brake pipe pressure from flowing to the auxiliary reservoir via duct 64. When valve 162 is in closed position and slide-valve 32 has been moved so as to register port 332 with small duct in sleeve 34, leading to duct 164, the brake pipe pressure flows to the auxiliary reservoir at a very slow rate until the brake cylinder pressure has reduced sufficiently via duct 135 to again permit valve 162 to be opened. Several seconds are required for the brake cylinder pressure to reduce to zero, because of the small bore of duct 136 in sleeve 34; thus facilitating a rapid increase in brake pipe pressure at the rear of the train and a quick release of those brakes. In the meanwhile the release of the brakes in vicinity of the locomotive has been delayed as explained above, thus resulting in a release of the brakes towards the head and rear end of the train at substantially the same time.

For most satisfactory train brake operation, the engineer should be furnished with a chart covering the time his brake valve should be held in release position when in the act of releasing the brakes. This time is based on the length of the train, amount of brake application, main reservoir, volume and pressure, etc. When the engineer has been skilled in this operation, this will be unnecessary. In case the engineer's brake valve is not held in release position a sufficient length of time, all brakes will release when the brake pipe pressure in chamber 11 has been restored sufficiently above that of chamber 5 to move slide valve 32 to release position, as shown in Fig. 4.

Further, if only part of the cars of a train are equipped with my pressure control device, means must be provided to permit all the brakes to be released when the engineer moves the brake valve to full release position, since such position will at once actuate the brakes on the cars provided only with standard equipment.

Such means comprise (see Figs. 10 to 14) a pin 95 rotatably carried in a boss 195 on the exterior portion of the housing of the secondary chamber 38, and extending radially into said chamber on the inner side of the diaphragm 39. The inner end of the pin 95 is cut away on one side so as to be semi-cylindrical, as at 295. A lug 395 is provided on the pin 95 adjacent the interior of the housing wall to hold the said pin 95 in place; and a lever arm 96 is provided on the outer end of the pin 95, and such lever arm is provided with a spring pressed catch 97 adapted to bear in recesses 196 in the boss, at each end of its movement.

In one position of the pin 95, the semi-cylindrical surface 195 bears against and prevents movement of the diaphragm 39, so that the valve 139 is inoperative and duct 239 is always open, and the pressure in chamber 5 will be maintained equal to that in the auxiliary reservoir. In operation, when the brakes are released, a slow rise in brake-pipe pressure in chamber 11, as at the rear end of the train, will move the slide valve 22 inward from its outermost position which it assumed by the greater auxiliary reservoir pressure in chamber 5, and open the exhaust ports 35; but a rapid rise, as at the head of the train, will move the slide valve 32 all the way inward, compressing spring 27, until the pressure in the brake pipe is equalized throughout its length, and the brake pipe pressure has fallen sufficiently to permit spring 27 to move diaphragm 8 and slide valve 32 outward to neutral position and open exhaust ports 135 and release the brakes at the head of the train substantially at the same time those at the rear are released.

My pressure control, when used with standard equipment, functions to assist the operation of the latter when the brakes are to be applied, in that, when the pressure control effects local reduction of air in the brake pipe, such fall of brake pipe pressure also actuates the triple valves of the standard equipment and causes them to also apply.

Further, when the brakes are released, if the standard equipment releases before the pressure control, no harm will be done, as the engineer will have the additional braking force of the brakes not released to hold the train in making a smooth stop.

Further, to effect an emergency application of the brakes, in which the brakes are to be applied immediately and with full force, the engineer need only make a proportionately greater reduction of pressure in the brake pipe than for a service application of the brakes.

But without my pressure control, to effect an emergency application, the engineer must exhaust all the pressure from the brake pipe after which the brakes are set and cannot be released until the train is stopped and the entire system pumped up again.

Résumé

The operation of my pressure control device is briefly as follows:

Assume that all the cars are equipped with my control devices and that the auxiliary reservoirs of the controls are charged and ready for operation; and the engineer has operated the brake valve to exhaust pressure from the brake pipe and apply the brakes; pressure in chambers 12 and 71 then falls, and in the control device on a car nearest the locomotive, the pressure will fall seven pounds or more, the amount exhausted from the brake pipe, and sufficient to actuate the triple valve and apply the brakes.

Then the pressure in chamber 6, which will be seven pounds or more greater than in chamber 12, will overcome the force of spring 172 and move diaphragm 9 and piston 72 against diaphragm 70 and hold slide valve 33 closed, as shown in Fig. 4c, so that no additional pressure is exhausted from the brake-pipe through duct 77, since the brakes of this car have been fully applied.

But, in the control device on a car at the rear of the train, where the reduction of pressure is not sufficient to actuate the triple valve, that is, less than seven pounds, the pressure in chamber 6 will be unable to overcome the force of spring 172 and move the piston 72 against the diaphragm 70, and the auxiliary reservoir pressure in chamber 171 being greater, not falling as fast as the brake pipe pressure, moves diaphragm 70 to the left, as shown in Fig. 4d, and opens the duct 77 to the atmosphere and permits brake pipe pressure from chamber 71 to exhaust, thus reducing the pressure sufficiently in the brake pipe adjacent the triple valve to actuate the latter and apply the brakes.

As soon as the pressure in chambers 71 and 12, fall seven pounds, namely, the force of spring 172, the triple valve and the brakes will be actuated. Then the pressure in chamber 6, which has not fallen because duct 85 is closed, will move piston 72 against diaphragm 70 and valve 33, and close duct 77, preventing further exhaust of brake pipe pressure from chamber 71.

In the event the brake pipe pressure rises, because of reflex pressure waves, the diaphragm 9 and piston 72 will be moved to the left again, and release diaphragm 70 and permit the auxiliary reservoir pressure in chamber 171 to move diaphragm 70 and slide valve 33 to the left, exhausting further pressure from the brake pipe. This operation will take place as often as necessary to obtain uniform reduction of pressure in the brake pipe throughout the train.

Now, assuming the brakes have been applied, and the engineer wishes to recharge the auxiliary reservoirs without releasing the brakes, he sets his brake valve at a pressure of approximately sixty-seven pounds, approximately three pounds less than his initial seventy pounds charge of the auxiliary reservoirs, and chamber 5, which has been shut off from the auxiliary reservoir by the brake cylinder pressure acting upon valve 139 and closing duct 239, will then be only one pound greater than in chamber 11, since the pressure in chamber 5 is now sixty-eight pounds, the pressure having fallen approximately two pounds before valve 139 was actuated by brake cylinder pressure.

But the fall of pressure in chamber 11 which occurred when the brakes were applied, permitted the pressure in chamber 5 to move diaphragm 8 to the left to the position shown in Fig. 4b, and closed the exhaust ports 35 in the brake cylinder. Then when the engineer returned the brake valve to running position with the pressure set at sixty-seven pounds, as mentioned, the pressure in chamber 11 being approximately one pound less than in chamber 5, is unable to move diaphragm 8 back to neutral position and open exhaust port 35 from the brake cylinders, thus preventing the release of the brakes, but the pressure in chamber 11 is sufficient to move valve 32 enough to open port 332 and permit pressure to flow from chamber 11 through ducts 132, 41, 47 and 45 to the auxiliary reservoir, thereby recharging the latter up to sixty-seven pounds, and in that way all the auxiliary reservoirs will be recharged to a uniform pressure.

Now, assuming the brakes are to be released, the engineer turns his brake valve to full release position, which raises the brake pipe to 130 pounds gauge pressure. In the cars nearest the locomotive, which are acted upon first by such increase of pressure, the diaphragm 8 is moved all the way to the right, the position shown in Fig. 4a, thereby holding the exhaust ports 35 from the brake cylinder closed and therefore the brakes are not yet released.

In the cars remote from the locomotive, however, as soon as the pressures in chambers 11 rise above the pressure in chambers 5, which is sixty-eight pounds, as mentioned, diaphragm 8 and slide valve 32 will be moved back to neutral position, shown in Fig. 4, from the left hand position, shown in Fig. 4b, where it is held by force of spring 27, and thus the exhaust ports 35 from the brake cylinders will be opened and the brakes in cars remote from the locomotive will be released.

Then the engineer immediately returns his brake valve to running position, which reduces the pressure in the brake pipe and in chambers 11 to seventy pounds, the brake valve having been again set at seventy pounds pressure, at the cars nearest the locomotive and the force of spring 27 moves diaphragm 8 and slide valve 32 back to neutral position, as shown in Fig. 4, and opens the exhaust ports 35 from the brake-cylinders and releases the brakes of these cars.

By my devices the release of the brakes of the cars nearest the locomotive is retarded sufficiently to permit a substantially simultaneous release of the brakes of the cars at the rear end of the train.

Furthermore, the auxiliary reservoirs cannot be overcharged while the brakes are being released, thereby avoiding an unintentional application of the brakes; for the greater pressure in the brake pipe will move the diaphragm 8 to the right, overcoming the force of spring 27 and closing ducts 41, 45 and 47 leading to the auxiliary reservoir, and prevent further charging of the auxiliary reservoir; the by-pass duct 64 being already closed by the brake cylinder pressure acting on valve 162.

Further, the auxiliary reservoirs on the cars nearest the locomotive cannot be recharged while in the act of releasing the brakes, because the valve 32 while in right hand position, closes the ducts 41, 47 and 45 to the auxiliary reservoirs. This prevents the increase of pressure in the brake pipe in the act of releasing the brakes from flowing into the auxiliary reservoirs which in a train composed of a large number of cars, would render the attempted release of the brakes of the rear cars ineffective, as above described.

I claim:

1. In combination with an air-brake mechanism including a triple valve element, a control-device interposed between the brake-pipe and the auxiliary reservoir, and in which the exhaust port of the brake cylinder is located, said control device comprising a retaining compression chamber and a second compression chamber, a diaphragm separating said chambers, a main duct connecting one of said chambers with the auxiliary reservoir, a control valve operated by said diaphragm, said valve in its normal position opening said duct and said exhaust port, in its other positions closing both said duct and said exhaust port, means adapted normally to place said control valve in its normal position and to resist the flexing of said diaphragm in one direction relatively to predetermined differences in pressures in said chambers, a supplemental control valve for said duct operated by pressure in said auxiliary reservoir when greater than that in the first mentioned chamber, a duct connecting the other of said chambers with the auxiliary reservoir, a valve adapted to close the latter duct, such valve operated by pressure in the brake cylinder, manual means adapted to render the latter valve inoperative, an auxiliary duct connecting the first mentioned chamber with said auxiliary reservoir, a third valve also operated by pressure in the brake chamber controlling said auxiliary duct.

2. The combination set forth by claim 1 distinguished in that the first mentioned of said compression chambers is of lesser volume than the other.

3. The combination set forth by claim 1 distinguished in that manual means are included to render inoperative the valve adapted to close the duct connecting the second mentioned chamber with the auxiliary reservoir.

4. In a control device for air brake mechanism of the character described, adapted to be interposed between the brake pipe and the auxiliary reservoir and in which the exhaust port of the brake cylinder is located, said control device comprising a retaining compression chamber and a second compression chamber, a diaphragm separating said chambers, a duct connecting one of said chambers with the auxiliary reservoir, a control valve operated by said diaphragm, said valve in its normal position opening said duct and said exhaust port, in its other positions closing both said duct and said exhaust port.

5. In a control device for air brake mechanism of the character described, adapted to be interposed between the brake pipe and the auxiliary reservoir, and in which the exhaust port of the brake cylinder is located, said control device comprising a retaining compression chamber and a second compression chamber, a diaphragm separating said chambers, a duct connecting one of said chambers with the auxiliary reservoir, a control valve operated by said diaphragm, said valve in its normal position opening said duct and said exhaust port, in its other positions closing both said duct and said exhaust port, but adapted when moved into its other positions to close said exhaust port in advance of said duct, and means adapted normally to place said control valve in its normal position.

6. In a control device for air brake mechanism of the character described, adapted to be interposed between the brake pipe and the auxiliary reservoir, and in which the exhaust port of the brake cylinder is located, said control device comprising a retaining compression chamber and a second compression chamber, a diaphragm separating said chambers, a duct connecting one of said chambers with the auxiliary reservoir, a control valve operated by said diaphragm, said valve in its normal position opening said duct and said exhaust port, in its other positions closing both said duct and said exhaust port, but adapted when moved into its other positions to close said exhaust port in advance of said duct, means adapted normally to place said control valve in its normal position and to resist the flexing of said diaphragm in one direction relatively to predetermined differences in pressures in said chambers.

7. In a control device for air brake mechanism of the character described, adapted to be interposed between the brake pipe and the auxiliary reservoir, and in which the exhaust port of the brake cylinder is located, said control device comprising a retaining compression chamber and a second compression chamber, a diaphragm separating said chambers, a duct connecting one of said chambers with the auxiliary reservoir, a control valve operated by said diaphragm, said valve in its normal position opening said duct and said exhaust port, in its other positions closing both said duct and said exhaust port, but adapted when moved into its other positions to close said exhaust port in advance of said duct, a spring adapted normally to place said control valve in its normal position and to resist the flexing of said diaphragm in one direction relatively to predetermined differences in pressures in said chambers.

8. The combination set forth by claim 6 distinguished in that said compression chambers are of unequal volume and the smaller of said chambers is connected with the auxiliary reservoir.

9. The combination set forth by claim 7 distinguished in that said compression chambers are of unequal volume and the smaller of said chambers is connected with the auxiliary reservoir.

10. The combination set forth by claim 4 distinguished in that there is included a supplemental control-valve for said duct, operated by pressure in said auxiliary reservoir when greater than that in the first mentioned chamber.

11. The combination set forth by claim 4 distinguished in that there is included a duct connecting the other of said chambers with the auxiliary-reservoir, and a valve adapted to close the latter duct, such valve operated by pressure in the brake cylinder.

12. The combination set forth by claim 4 distinguished in that there is included an auxiliary duct connecting the first mentioned chamber with said auxiliary-reservoir, and a valve operated by pressure in the brake-chamber, controlling said auxiliary duct.

13. A control device for air brake mechanism of the character described, adapted to be interposed between the brake-pipe and the auxiliary reservoir and in which the exhaust port of the brake cylinder is located, said device comprising two compression chambers, a diaphragm separating said chambers, a duct connecting one of said chambers with the auxiliary reservoir, a control valve operated by said diaphragm, said valve in its normal position opening said duct and said exhaust port and in its other positions closing both said duct and said exhaust port, a duct connecting the other of said chambers with the auxiliary reservoir, a valve adapted to close the latter duct, such valve operated by pressure in the brake cylinder, and manual means operable to render the latter valve inoperative.

14. In a control device for air brake mechanism of the character described, adapted to be interposed between the brake pipe and the auxiliary reservoir, and in which the exhaust port of the brake cylinder is located, said control device comprising two compression chambers, a diaphragm separating said chambers, a main duct and an auxiliary duct connecting one of said chambers with said auxiliary reservoir, valves controlling said ducts, respectively, one of said valves operated by said diaphragm, the other valve operated by pressure in the brake cylinder.

15. The combination set forth by claim 14 distinguished in that there is included a resistance to the movement, in one direction, of the valve operated by said diaphragm, such resistance determined relatively to predetermined differences in pressures in said chambers.

16. The combination set forth by claim 14 distinguished in that said compression chambers are of unequal volume and the smaller of said chambers is connected with the auxiliary reservoir.

17. A control device for air brake mechanism of the character described, adapted to be interposed between the brake pipe and the auxiliary reservoir, and in which the exhaust port of the brake cylinder is located, said control device comprising two compression chambers, a diaphragm separating said chambers, a main duct and an auxiliary duct connecting one of said chambers with said auxiliary reservoir, valves controlling said ducts, respectively, one of said valves operated by said diaphragm, the other valve operated by pressure in the brake cylinder, said compression chambers being of unequal volume and the smaller thereof being connected with said auxiliary reservoir, and a resistance interposed to the movement in one direction of the valve operated by said diaphragm, such resistance determined relatively to the predetermined differences in pressures in said chambers.

18. In combination with air brake mechanism including a triple valve element, means adapted to supplement the reduction of brake pipe pressure in the application of the brakes, such means comprising a supplementary compression chamber and an intermediate compression chamber separated by a diaphragm, a second intermediate compression chamber and an auxiliary compression chamber separated by a second diaphragm, a port connecting the first and second intermediate chambers, said auxiliary compression chamber connected with the auxiliary reservoir, a duct connecting the second intermediate chamber with the atmosphere, a second duct connecting said supplementary compression chamber and said auxiliary compression chamber, and a valve operated by the second diaphragm controlling said ducts, and whereby one of said ducts is closed when the other is opened and vice versa.

19. The combination set forth by claim 18 distinguished in that there are included means adapted to interpose resistance to the flexing of said diaphragms, respectively, such resistance determined relatively to predetermined differences in pressures in said chambers.

20. The combination set forth by claim 18 distinguished in that there is included a spring-controlled pressure-operated supplemental valve for the first mentioned duct, the opposite sides of such valve connected with the auxiliary reservoir and the brake cylinder, respectively, said valve being normally open and closed when pressure in the brake-cylinder plus the force of said controlling spring is greater than the pressure in the auxiliary reservoir.

21. Means adapted to be connected with the brake pipe and the auxiliary reservoir of air brake mechanism and to supplement the reduction of brake pipe pressure in the application of the brakes, such means comprising a supplementary compression chamber and an intermediate compression chamber separated by a diaphragm, a second intermediate compression chamber and an auxiliary compression chamber separated by a second diaphragm, a port connecting the first and second intermediate chambers, said auxiliary compression chamber connected with the auxiliary reservoir, a duct connecting the second intermediate chamber with the atmosphere, a second duct connecting said supplementary compression chamber and said auxiliary compression chamber, a valve operated by the second diaphragm controlling said ducts, and whereby one of said ducts is closed when the other is opened and vice versa.

22. The combination set forth by claim 21 distinguished in that there is included means adapted to interpose resistance to the flexing of said diaphragms, respectively, such resistance determined relatively to predetermined differences in pressures in said chambers.

23. The combination set forth by claim 21 distinguished in that there is included spring controlled means adapted to interpose resistance to the flexing of said diaphragms, respectively, such resistance determined relatively to predetermined differences in pressures in said chambers.

24. The combination set forth by claim 21 distinguished in that said lateral chambers are of unequal volume, and the smaller of said chambers is connected with the auxiliary reservoir.

25. The combination set forth by claim 21 distinguished in that said chamber spaces are of unequal volume, and said duct connects the smaller of said chamber spaces with the atmosphere.

26. The combination set forth by claim 21 distinguished in that said lateral chambers are of unequal volume, said chamber-spaces are of unequal volume, and said duct connects the smaller of said chamber spaces with the atmosphere.

27. The combination set forth by claim 21 distinguished in that the second duct is adapted to effect a predetermined retardation of the flow of air-pressure therethrough.

28. The combination set forth by claim 21 distinguished in that it includes a spring-controlled pressure-operated supplemental valve for the first mentioned duct, the opposite sides of such valve being connected with the auxiliary reservoir and the brake-cylinder, respectively, said valve being normally open, and adapted to be closed when pressure in the brake-cylinder plus the force of said controlling spring is greater than the pressure in the auxiliary reservoir.

29. In combination with air-brake mechanism including a triple-valve element, a control device interposed between the brake pipe and the auxiliary reservoir, and in which control device the exhaust port of the brake cylinder is located, said control device providing a passageway between the brake-pipe and the auxiliary reservoir, a diaphragm valve, operated by brake pipe pressure, controlling both said passageway and said exhaust port, means adapted normally to place said control valve in its normal position and to resist the flexing of said diaphragm in one direction relatively to predetermined differences in pressures in the brake pipe and the auxiliary reservoir, said control including a supplemental outlet for the brake pipe pressure, when reduced to apply the brakes, a diaphragm valve controlling said supplemental outlet, such valve normally closed and adapted to be operated by reduction in brake pipe pressure relative to auxiliary reservoir pressure, when the former is less than a predetermined amount.

30. In combination with air-brake mechanism including a triple valve element, a control device interposed between the brake pipe and the auxiliary reservoir, and in which the exhaust port of the brake cylinder is located, said control device providing a passageway between the brake pipe and the auxiliary reservoir, a diaphragm valve, operated by brake pipe pressure, controlling both said passageway and said exhaust port, means adapted to supplement the reduction of brake pipe pressure in the application of the brakes, such means comprising intermediate and lateral chambers separated by diaphragms, one of the lateral chambers connected with the auxiliary reservoir, said intermediate chamber sub-divided into spaces connected by a port, a duct connecting one of said chamber spaces with the atmosphere, a second duct connecting said lateral chambers, a valve operated by the diaphragm separating the chamber space adjacent the chamber connected with the auxiliary reservoir, said valve controlling said ducts and adapted to close one thereof when opening the other and vice versa.

31. A control device for air brake mechanisms adapted to be interposed between the brake pipe and the auxiliary reservoir, and in which the exhaust port of the brake cylinder is located, said control device providing a passageway between the brake pipe and the auxiliary reservoir, a diaphragm valve, operated by brake pipe pressure, controlling both said passageway and said exhaust port, means adapted to supplement the reduction of brake pipe pressure in the application of the brakes, such means comprising intermediate and lateral chambers separated by diaphragms, one of the lateral chambers connected with the auxiliary reservoir, said intermediate chamber sub-divided into spaces connected by a port, a duct connecting one of said chamber spaces with the atmosphere, a second duct connecting said lateral chambers, a valve operated by the diaphragm separating the chamber space adjacent the chamber connected with the auxiliary reservoir, said valve controlling said ducts and adapted to close one thereof when opening the other and vice versa.

32. The combination set forth in claim 31 distinguished in that means are included adapted to interpose resistance to the flexing of said diaphragms, respectively, such resistance determined relatively to predetermined differences in pressures in said chambers.

33. A control for air brake mechanism adapted to be interposed, and providing the passageways between the brake pipe and the auxiliary reservoir of the air brake mechanism, and the exhaust port of the brake cylinder being located in said control, a valve element actuated by a diaphragm controlling said passageways and said exhaust port, whereby said valve element is operated by predetermined differences in pressure in the brake pipe and the auxiliary reservoir.

34. A control for air brake mechanism adapted to be interposed, and providing the passageways between the brake pipe and the auxiliary reservoir of the air brake mechanism, and the exhaust port of the brake cylinder being located in said control, a valve element actuated by a diaphragm controlling said passageways and said exhaust port, whereby said valve element is operated by predetermined differences in pressure in the brake pipe, the auxiliary reservoir and the brake cylinder.

35. A control for air brake mechanism adapted to be interposed, and providing the passageways between the brake pipe and the auxiliary reservoir of the air brake mechanism and the exhaust port of the brake cylinder being located in said control, a valve element actuated by a diaphragm controlling said passageways and said exhaust port, whereby said valve element is operated by predetermined differences in pressure in the brake pipe, the auxiliary reservoir and the brake cylinder, said control also provided with a supplemental outlet for the brake pipe pressure when reduced to apply the brakes, a second valve element actuated by a diaphragm controlling such supplemental outlet, whereby said second valve element is operated by predetermined differences in pressures in the brake pipe and the auxiliary reservoir.

36. A control for air brake mechanism adapted to be interposed and to provide the passageways between the brake pipe and the auxiliary reservoir of the air brake mechanism and the exhaust port of the brake cylinder being located in said control, said control also provided with a supplemental outlet for the brake pipe pressure when reduced to apply the brakes, valve elements controlling said passageways, exhaust port and supplemental outlet, respectively, and diaphragms actuating said valve elements and whereby the latter are operated by predetermined differences in pressures in the brake pipe, the auxiliary reservoir, and the brake cylinder.

37. In a control device for air-brake mechanism of the character described, adapted to be interposed between the brake pipe and the auxiliary reservoir, and in which control device the exhaust port of the brake cylinder is located, said control device comprising two compression chambers, a diaphragm separating said chambers, a duct connecting one of said chambers with the auxiliary reservoir, a control valve operated by said diaphragm, said valve in its normal position opening said duct and said exhaust port, in its other positions closing both said duct and said exhaust port, but adapted when moved into its other positions to close said exhaust port in advance of said duct.

38. A control device adapted to be interposed between the brake pipe and the auxiliary reservoir of air brake mechanism of the character described, said device comprising a diaphragm operated slide valve, an outlet from the brakepipe to atmosphere, such outlet controlled by said slide valve, an axially slidable, diaphragm actuated member operating said slide valve in one direction, an exterior pressure chamber located at the outer side of each of said operating diaphragms, one of said exterior pressure chambers connected to the auxiliary reservoir of the air-brake mechanism, said exterior pressure chambers connected by a duct also controlled by said slide valve, the latter closing said duct in advance of opening said outlet, another pressure chamber intermediate said operating diaphragms, such pressure chamber connected to the brake pipe.

39. The control device described by claim 38 in which the slide valve is adapted to close the duct connecting the exterior pressure chambers in advance of opening the outlet from the brake pipe.

OLIVER SEIFFERLE.